(12) United States Patent
Sugimoto

(10) Patent No.: US 9,457,870 B2
(45) Date of Patent: Oct. 4, 2016

(54) BICYCLE SPROCKET

(71) Applicant: SHIMANO INC., Sakai (JP)

(72) Inventor: Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 287 days.

(21) Appl. No.: 14/163,070

(22) Filed: Jan. 24, 2014

(65) Prior Publication Data
US 2015/0210352 A1 Jul. 30, 2015

(51) Int. Cl.
*B62M 9/10* (2006.01)

(52) U.S. Cl.
CPC ..................... *B62M 9/105* (2013.01)

(58) Field of Classification Search
CPC ........ B62M 9/10; B62M 9/105; B62M 9/12; F16H 55/30
USPC ................. 474/140, 152, 160, 161
See application file for complete search history.

(56) References Cited

U.S. PATENT DOCUMENTS

| | | | |
|---|---|---|---|
| 5,192,248 A | 3/1993 | Nagano | |
| 5,413,534 A * | 5/1995 | Nagano | B62M 9/105 474/160 |
| 5,876,296 A * | 3/1999 | Hsu | B62M 9/10 474/140 |
| 6,007,442 A | 12/1999 | Schmidt | |
| 8,491,428 B2 | 7/2013 | Emura et al. | |
| 2002/0006842 A1 * | 1/2002 | Tetsuka | B62M 9/10 474/160 |
| 2005/0282671 A1 * | 12/2005 | Emura | B62M 9/105 474/160 |
| 2006/0058140 A1 * | 3/2006 | Nakano | B62M 9/10 474/152 |
| 2007/0265122 A1 * | 11/2007 | Emura | B62M 9/105 474/152 |
| 2009/0098966 A1 * | 4/2009 | Kamada | B62M 9/10 474/160 |
| 2014/0013900 A1 * | 1/2014 | Shiraishi | B62M 9/105 74/594.2 |
| 2014/0335987 A1 * | 11/2014 | Iwai | F16H 55/303 474/161 |

FOREIGN PATENT DOCUMENTS

JP    3290688 B2    10/1993

* cited by examiner

*Primary Examiner* — William E Dondero
*Assistant Examiner* — Robert T Reese
(74) *Attorney, Agent, or Firm* — Mori & Ward, LLP

(57) ABSTRACT

A bicycle sprocket comprises a first sprocket member, a projection, and a bump portion. The first sprocket member is rotatable about a rotational center axis and configured to engage with a bicycle chain. The projection is provided to the first sprocket member and is configured to guide the bicycle chain to engage with the first sprocket member in a first chain-phase state where the bicycle chain is shifted from a second sprocket member to the first sprocket member. The bump portion is provided to the first sprocket member and is configured to guide the bicycle chain away from the first sprocket member in an axial direction parallel to the rotational center axis in a second chain-phase state that is different from the first chain phase state.

25 Claims, 13 Drawing Sheets

BICYCLE SPROCKET

BACKGROUND OF THE INVENTION

1. Field of the Invention

The present invention relates to a bicycle sprocket.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain.

SUMMARY OF THE INVENTION

In accordance with a first aspect of the present invention, a bicycle sprocket comprises a first sprocket member, a projection, and a bump portion. The first sprocket member is rotatable about a rotational center axis and configured to engage with a bicycle chain. The projection is provided to the first sprocket member and is configured to guide the bicycle chain to engage with the first sprocket member in a first chain-phase state where the bicycle chain is shifted from a second sprocket member to the first sprocket member. The bump portion is provided to the first sprocket member and is configured to guide the bicycle chain away from the first sprocket member in an axial direction parallel to the rotational center axis in a second chain-phase state that is different from the first chain phase state.

In accordance with a second aspect of the present invention, the bicycle sprocket according to the first aspect is configured so that the bump portion is provided on a downstream side with respect to the projection in a driving rotational direction of the bicycle sprocket.

In accordance with a third aspect of the present invention, the bicycle sprocket according to the first aspect is configured so that the first sprocket member includes first sprocket teeth arranged in a circumferential direction of the bicycle sprocket. Each of the first sprocket teeth has a tooth bottom defining a root circle of the first sprocket teeth. The projection is disposed adjacent to the root circle.

In accordance with a fourth aspect of the present invention, the bicycle sprocket according to the first aspect is configured so that the bump portion is positioned radially inwardly from the projection.

In accordance with a fifth aspect of the present invention, the bicycle sprocket according to the first aspect is configured so that a distance between the projection and the bump portion is equal to or shorter than a maximum longitudinal length of an outer link plate of the bicycle chain.

In accordance with a sixth aspect of the present invention, the bicycle sprocket according to the first aspect is configured so that the first sprocket member includes a first main body having an annular shape, and a first sprocket body attached to the first main body and including first sprocket teeth arranged in a circumferential direction of the bicycle sprocket.

In accordance with a seventh aspect of the present invention, the bicycle sprocket according to the sixth aspect is configured so that the bump portion is integrally provided with the first main body as a single unitary member.

In accordance with an eighth aspect of the present invention, the bicycle sprocket according to the sixth aspect is configured so that the bump portion is attached to the first sprocket member as a separate member from the first main body.

In accordance with a ninth aspect of the present invention, the bicycle sprocket according to the sixth aspect is configured so that the first main body includes a base portion to which the first sprocket body is attached, and a cover portion attached to the base portion to at least partially cover the base portion.

In accordance with a tenth aspect of the present invention, the bicycle sprocket according to the sixth aspect is configured so that the first sprocket body is made of a first material comprising one of iron and titanium.

In accordance with an eleventh aspect of the present invention, the bicycle sprocket according to the sixth aspect is configured so that the first sprocket body has a multi-layered structure with different materials.

In accordance with a twelfth aspect of the present invention, the bicycle sprocket according to the eleventh aspect is configured so that the first sprocket body includes a first sprocket layer, a second sprocket layer, and a third sprocket layer. The first sprocket layer is made of a first-layer material comprising iron. The second sprocket layer is made of a second-layer material comprising aluminum. The third sprocket layer is made of a third-layer material comprising iron. The second sprocket layer is provided between the first sprocket layer and the third sprocket layer in the axial direction.

In accordance with a thirteenth aspect of the present invention, the bicycle sprocket according to the eleventh aspect is configured so that the first sprocket body includes a first sprocket layer, a second sprocket layer, and a third sprocket layer. The first sprocket layer is made of a first-layer material comprising iron. The second sprocket layer is made of a second-layer material comprising a non-metallic material. The third sprocket layer is made of a third-layer material comprising iron. The second sprocket layer is provided between the first sprocket layer and the third sprocket layer in the axial direction.

In accordance with a fourteenth aspect of the present invention, the bicycle sprocket according to the thirteenth aspect is configured so that the second-layer material comprises fiber reinforced plastic.

In accordance with a fifteenth aspect of the present invention, the bicycle sprocket according to the sixth aspect is configured so that the first main body is made of a metallic material comprising aluminum.

In accordance with a sixteenth aspect of the present invention, the bicycle sprocket according to the sixth aspect is configured so that the first main body comprises a non-metallic material.

In accordance with a seventeenth aspect of the present invention, the bicycle sprocket according to the sixteenth aspect is configured so that the non-metallic material comprises fiber reinforced plastic.

In accordance with an eighteenth aspect of the present invention, the bicycle sprocket according to the seventeenth aspect is configured so that the first sprocket body and the first main body are attached to each other by an integral molding process.

In accordance with a nineteenth aspect of the present invention, the bicycle sprocket according to the sixth aspect is configured so that the first sprocket body includes a first-sprocket attachment surface. The first main body includes a first main-body attachment surface configured to be attached to the first sprocket attachment surface of the first sprocket body. At least one of the first sprocket attachment surface and the first main-body attachment surface is at least partially rougher than a surface of the first sprocket member other than the first sprocket attachment surface and the first main-body attachment surface.

In accordance with a twentieth aspect of the present invention, the bicycle sprocket according to the sixth aspect is configured so that the first main body includes a crank attachment portion to which a crank arm is to be attached.

In accordance with a twenty-first aspect of the present invention, the bicycle sprocket according to the first aspect is configured so that the first sprocket member includes a first recess configured to reduce interference between the first sprocket member and the bicycle chain when the projection guides the bicycle chain to engage with the first sprocket member. The bump portion is provided between the projection and the first recess.

In accordance with a twenty-second aspect of the present invention, the bicycle sprocket according to the twenty-first aspect is configured so that the first sprocket member includes a second recess to reduce interference between the first sprocket member and the bicycle chain when the projection guides the bicycle chain to engage with the first sprocket member. The second recess is at least partially provided between the projection and the first recess. The bump portion is at least partially provided between the first recess and the second recess.

In accordance with a twenty-third aspect of the present invention, the bicycle sprocket according to the first aspect is configured so that the first sprocket member includes an axial surface facing in the axial direction of the bicycle sprocket. The bump portion is provided on the axial surface of the first sprocket member to protrude from the axial surface in the axial direction. The bump portion is configured to guide the bicycle chain away from the axial surface of the first sprocket member in the axial direction in the second chain-phase state.

In accordance with a twenty-fourth aspect of the present invention, the bicycle sprocket according to the first aspect is configured so that the first sprocket member includes first sprocket teeth arranged in a circumferential direction of the bicycle sprocket. Each of the first sprocket teeth has a tooth bottom defining a root circle of the first sprocket teeth. The first sprocket member further includes a closed tooth opening at least partially positioned radially outward from the root circle.

In accordance with a twenty-fifth aspect of the present invention, the bicycle sprocket according to the first aspect is configured so that the first sprocket member includes first sprocket teeth arranged at a first pitch angle in a circumferential direction of the bicycle sprocket. A central angle corresponding to a minimum circumferential distance between the projection and the bump portion is less than the first pitch angle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
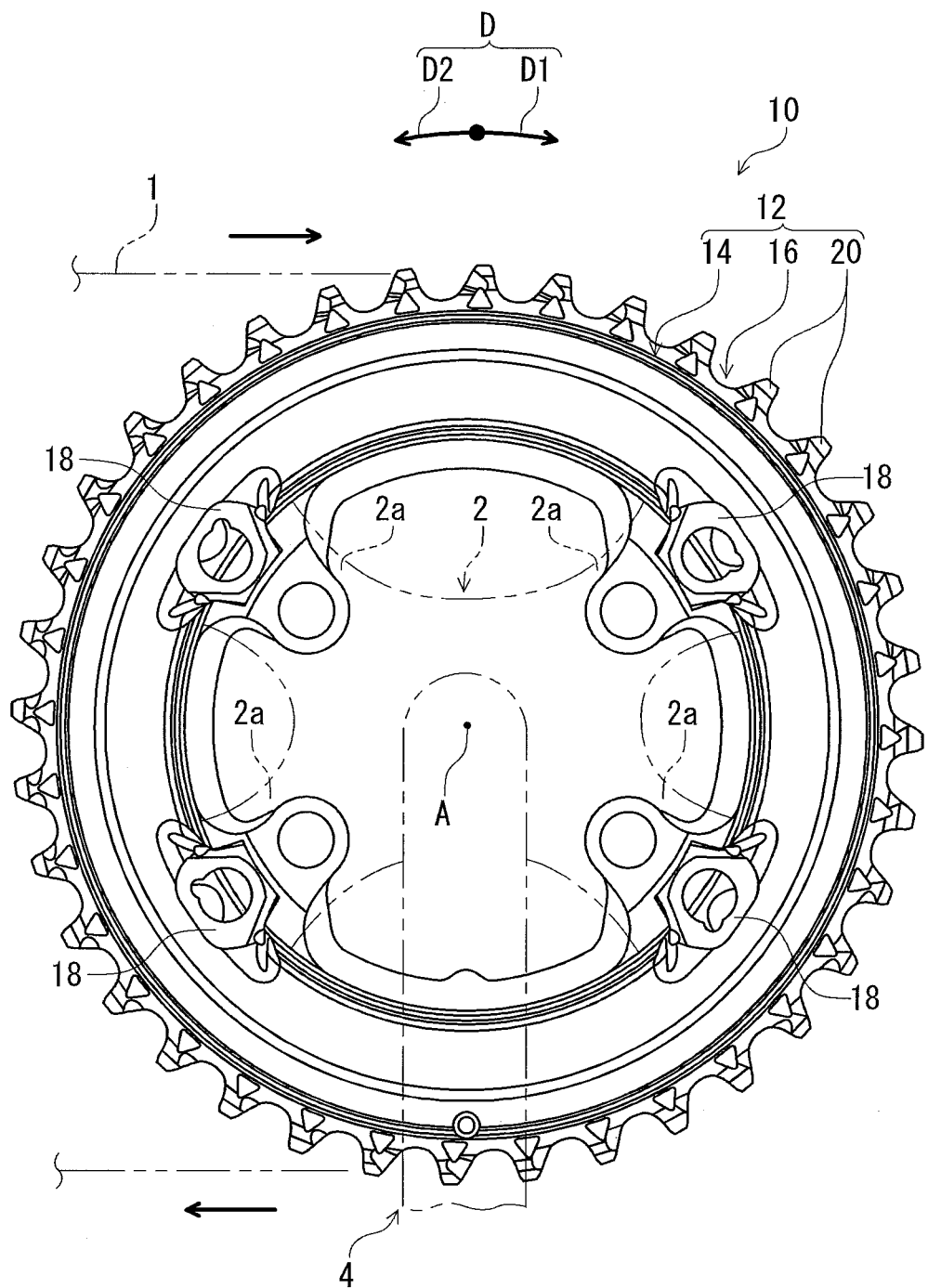
FIG. 1 is an outside elevational view of a bicycle sprocket in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket 10 in accordance with a first embodiment is illustrated. The bicycle sprocket 10 is a front sprocket configured to be provided on a gear crank (right crank) of a bicycle. The first sprocket member 12 is rotatable about a rotational center axis A and is configured to engage with a bicycle chain 1. The bicycle sprocket 10 is configured to be fastened to crank connecting arms 2a of a sprocket mounting member 2 by bolts (not shown). The sprocket mounting member 2 is fastened on a crank arm 4 to be rotatable integrally with the crank arm 4 about the rotational center axis A. Namely, the bicycle sprocket 10 is configured to be rotatable integrally with the sprocket mounting member 2 and the crank arm 4 about the rotational center axis A. The bicycle sprocket 10 is configured to be rotated about the rotational center axis A in a rotational driving direction D1 during the pedaling. The rotational driving direction D1 is defined along a circumferential direction D of the bicycle sprocket 10. A direction D2 is defined along the circumferential direction D. The direction D2 is opposite to the rotational driving direction D1.

As seen in FIG. 1, the bicycle sprocket 10 comprises a first sprocket member 12. The first sprocket member 12 includes a first main body 14 and a first sprocket body 16. The first main body 14 has an annular shape. The first main body 14 includes a crank attachment portion to which the crank arm 4 is to be attached. More specifically, the first main body 14 includes crank attachment portions 18 to which the crank arm 4 is to be attached. In the illustrated embodiment, the crank arm 4 is attached to the crank attachment portions 18 via the sprocket mounting member 2. The first sprocket body 16 is attached to the first main body 14 and includes first sprocket teeth 20 arranged in a circumferential direction D of the bicycle sprocket 10. Namely, the first sprocket member 12 includes first sprocket teeth 20 arranged in the circumferential direction D of the bicycle sprocket 10.

Figure 2:
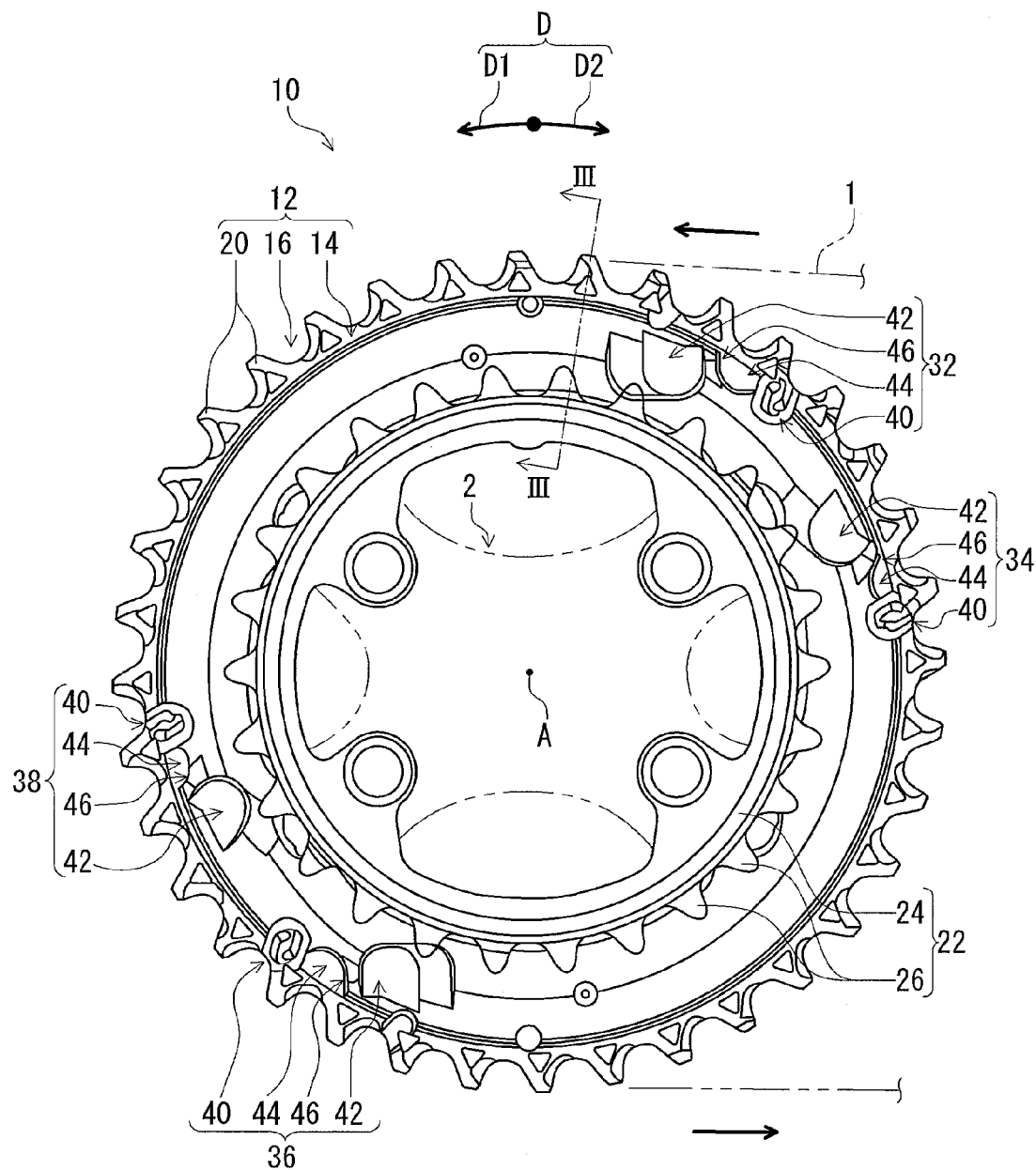
FIG. 2 is an inside elevational view of the bicycle sprocket illustrated in FIG. 1.

As seen in FIG. 2, the bicycle sprocket 10 further comprises a second sprocket member 22. The second sprocket member 22 is rotatable about the rotational center axis A and is configured to engage with the bicycle chain 1. The second sprocket member 22 includes a second main body 24 and second sprocket teeth 26. The second main body 24 has an annular shape and is fastened to the sprocket mounting member 2 by bolts (not shown). The second sprocket member 22 is coupled to the first sprocket member 12 via the sprocket mounting member 2. The first sprocket member 12 and the second sprocket member 22 are integrally rotatable with each other about the rotational center axis A. The second sprocket teeth 26 are arranged in the circumferential direction D of the bicycle sprocket 10. A total number of the second sprocket teeth 26 is less than a total number of the first sprocket teeth 20 of the first sprocket member 12.

Figure 3:
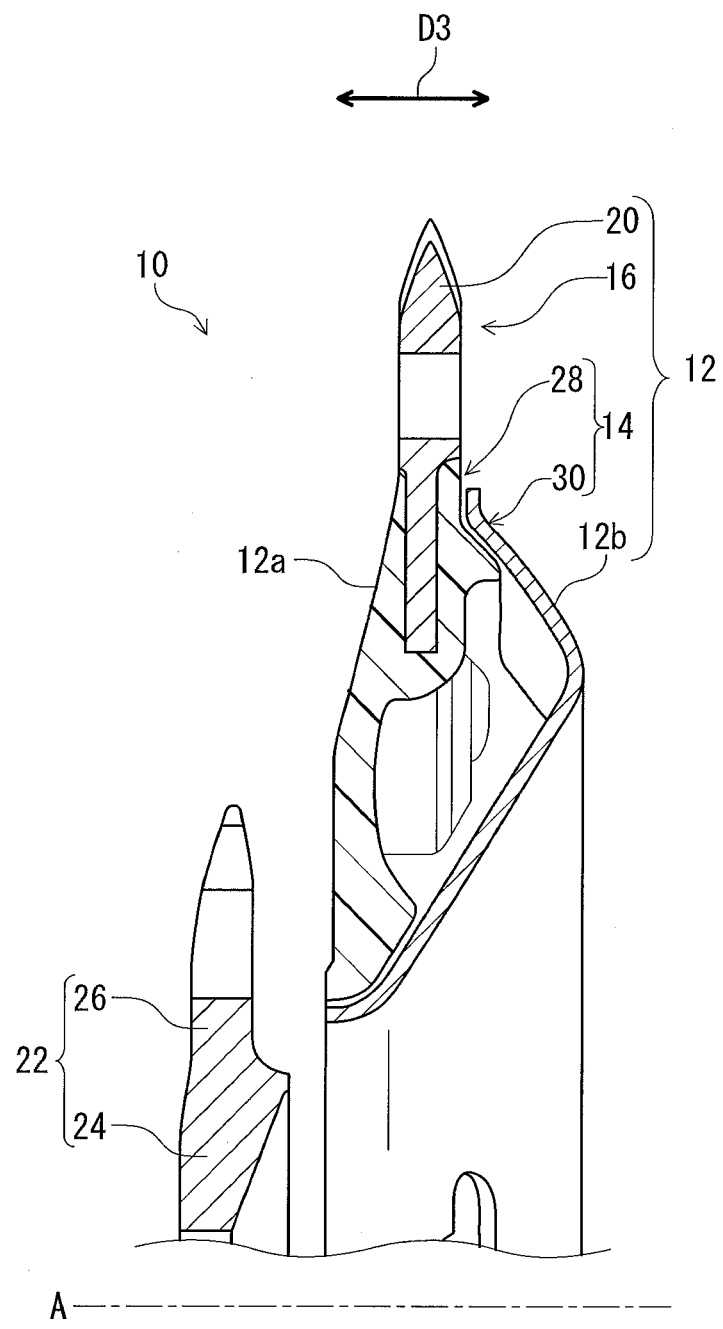
FIG. 3 is a cross-sectional view of the bicycle sprocket taken along line III-III of FIG. 2.

As seen in FIG. 3, the first main body 14 includes a base portion 28 to which the first sprocket body 16 is attached, and a cover portion 30 attached to the base portion 28 to at least partially cover the base portion 28. In the illustrated embodiment, the first sprocket body 16 is made of a first material comprising one of iron and titanium. The first main body 14 comprises a non-metallic material. For example, the non-metallic material comprises fiber reinforced plastic. More specifically, the base portion 28 is made of a non-metallic material comprising fiber reinforced plastic while the cover portion 30 is made of a metallic material comprising aluminum, for example. In the illustrated embodiment, the first sprocket body 16 and the first main body 14 are attached to each other by an integral molding process. More specifically, the first sprocket body 16 and the base portion 28 are attached to each other by the integral molding process. The first sprocket body 16 is at least partially embedded in the first main body 14 (i.e., the base portion 28). The base portion 28 and the cover portion 30 can, however, be integrally provided with each other as a single unitary member. In such an embodiment, the first main body 14 is made of a metallic material comprising aluminum, for example.

As seen in FIG. 3, the first sprocket member 12 includes an axial surface 12a facing in an axial direction D3 of the bicycle sprocket 10. The axial direction D3 is parallel to the rotational center axis A of the bicycle sprocket 10. The first sprocket member 12 further includes an opposite surface 12b opposite to the axial surface 12a in the axial direction D3. The opposite surface 12b is defined on the cover portion 30. The axial surface 12a is disposed closer to the second sprocket member 22 than the opposite surface 12b. The axial surface 12a is inclined with respect to the axial direction D3; however, the axial surface 12a can be perpendicular to the axial direction D3.

As seen in FIG. 2, the bicycle sprocket 10 includes shift-assisting parts 32, 34, 36 and 38 configured to assist the gear-shifting operation. The shift-assisting parts 32, 34, 36 and 38 have the same structures as each other. The shift-assisting parts 32, 34, 36 and 38 are spaced apart from each other in the circumferential direction D. The shift-assisting part 32 will be described in detail below. Since the shift-assisting parts 34, 36 and 38 have the same structure as the shift-assisting part 32, the shift-assisting parts 34, 36 and 38 will not be described in detail here for the sake of brevity.

Figure 4:
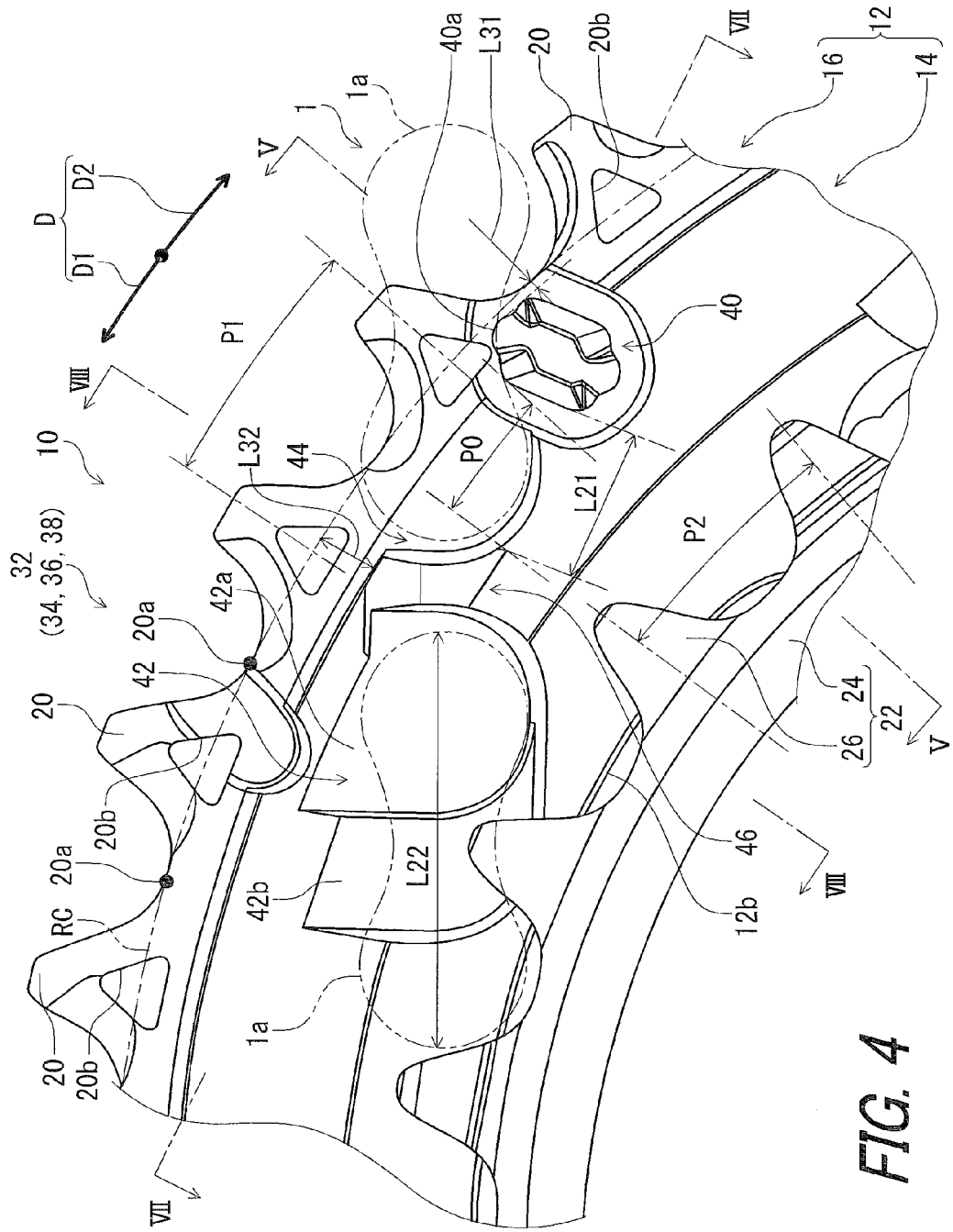
FIG. 4 is an enlarged inside elevational view of a part of the bicycle sprocket illustrated in FIG. 2 (a first chain-phase state)

As seen in FIG. 4, the bicycle sprocket 10 comprises a projection 40 provided in the shift-assisting part 32. The projection 40 is provided to the first sprocket member 12. The projection 40 is a spike pin and is attached to the first sprocket member 12. The projection 40 is made of a metallic material and is attached to the first sprocket body 16, for example. In the illustrated embodiment, the projection 40 is separately provided from the first sprocket member 12; however, the projection 40 can be integrally provided with the first sprocket member 12 as a single unitary member. The projection 40 is configured to guide the bicycle chain 1 to engage with the first sprocket member 12 in a first chain-phase state where the bicycle chain 1 is shifted from the second sprocket member 22 to the first sprocket member 12. Accordingly, the term "first chain-phase state", as used herein, means a state in which an outer link plate of a bicycle chain is positioned on a projection (e.g., a spike pin) so that the projection engages with the outer link plate. When the bicycle chain 1 is axially guided toward the first sprocket member 12 using a front derailleur (not shown) during the gear-shifting operation, the bicycle chain 1 is upwardly moved by the projection 40 to engage with the first sprocket member 12 in the first chain-phase state.

Figure 5:
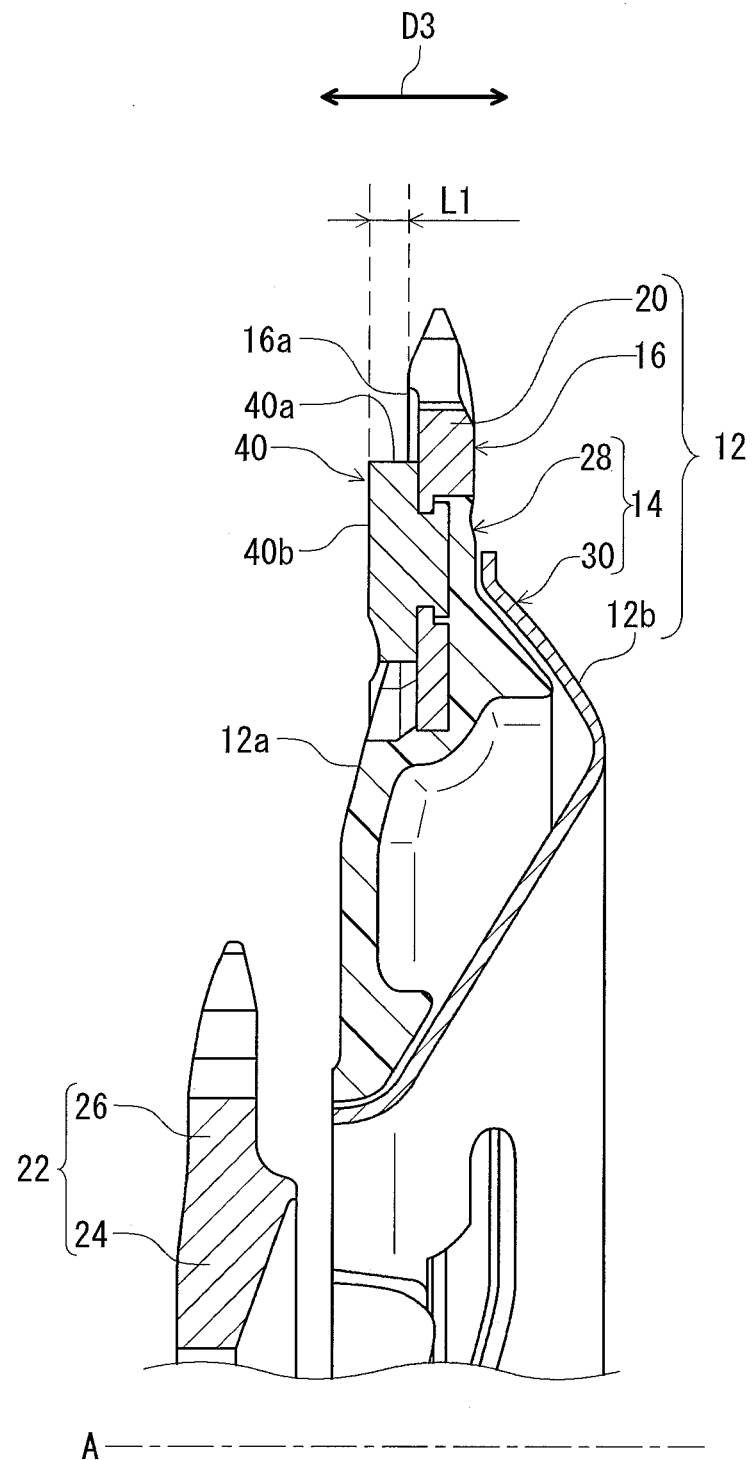
FIG. 5 is a cross-sectional view of the bicycle sprocket taken along line V-V of FIG. 4.

As seen in FIG. 5, the projection 40 at least partially protrudes from the axial surface 12a of the first sprocket member 12. The projection 40 includes a guiding part 40a and an axial side surface 40b. The guiding part 40a is disposed to radially outward face and is configured to contact outer link plates of the bicycle chain 1 when the projection 40 guides the bicycle chain 1 to engage with the first sprocket member 12.

Figure 6:
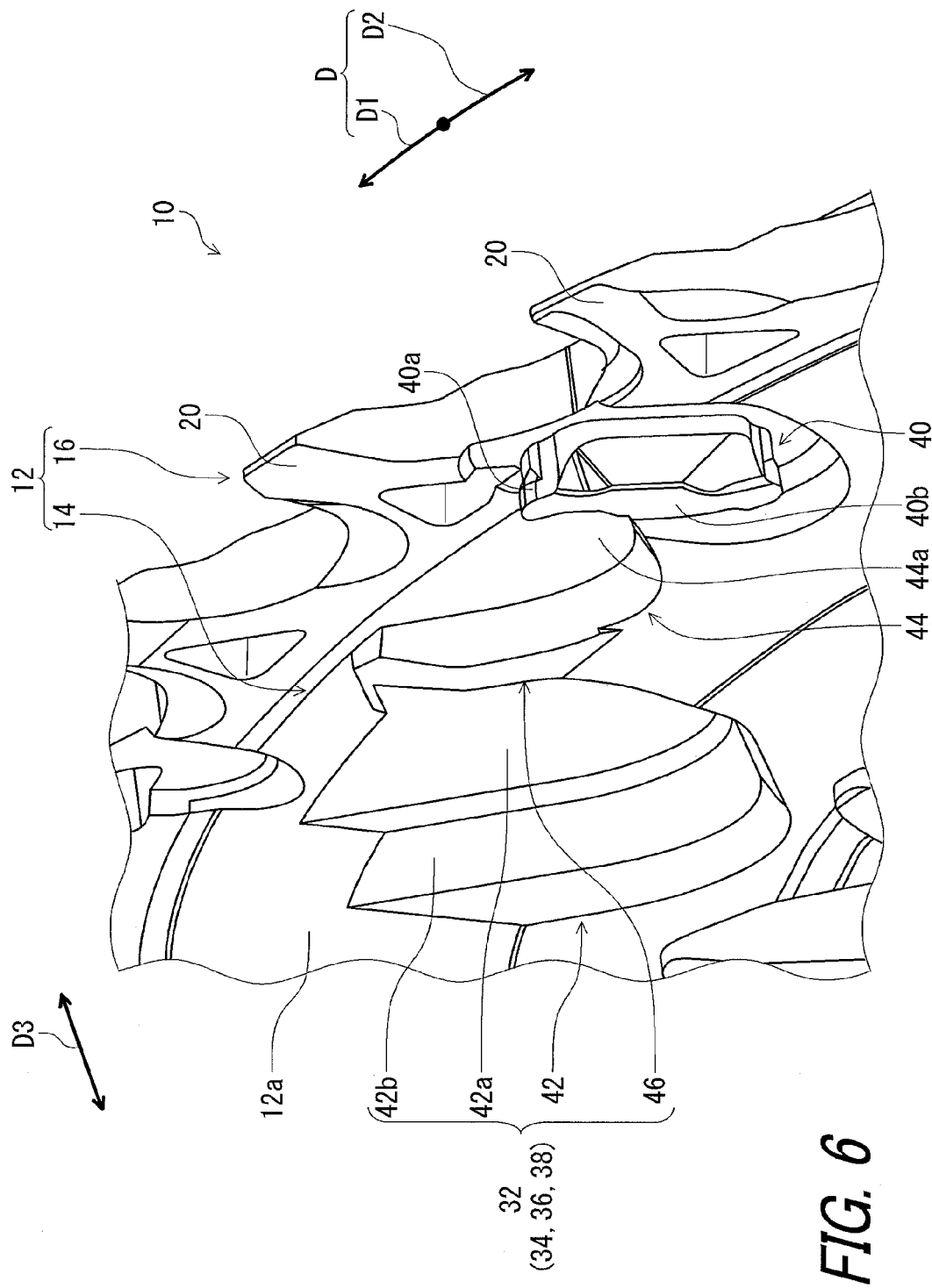
FIG. 6 is a perspective view of a part of the bicycle sprocket illustrated in FIG. 1.

As seen in FIGS. 4 and 6, the first sprocket member 12 includes a first recess 42 configured to reduce interference between the first sprocket member 12 and the bicycle chain 1 when the projection 40 guides the bicycle chain 1 to engage with the first sprocket member 12. The first recess 42 is provided in the shift-assisting part 32. As seen in FIG. 4, the first recess 42 is configured to reduce interference between the first sprocket member 12 and the bicycle chain 1 in the first chain-phase state. An outer link plate 1a of the bicycle chain 1 is partially disposed in the first recess 42 in the first chain-phase state.

As seen in FIG. 6, the first recess 42 is provided on the first main body 14 of the first sprocket member 12. The first recess 42 includes a first side surface 42a and a second side surface 42b which are offset from the axial surface 12a of the first sprocket member 12 in the axial direction D3 toward the first sprocket body 16. The first side surface 42a is offset from the second side surface 42b in the axial direction D3 toward the first sprocket body 16.

As seen in FIGS. 4 and 6, the first sprocket member 12 includes a second recess 44 to reduce interference between the first sprocket member 12 and the bicycle chain 1 when the projection 40 guides the bicycle chain 1 to engage with the first sprocket member 12. The second recess 44 is provided in the shift-assisting part 32. As seen in FIG. 4, the second recess 44 is configured to reduce interference between the first sprocket member 12 and the bicycle chain 1 in the first chain-phase state. The second recess 44 is at least partially provided between the projection 40 and the first recess 42.

As seen in FIG. 6, the second recess 44 is provided on the first main body 14 of the first sprocket member 12. The second recess 44 includes a third side surface 44a which is offset from the axial surface 12a of the first sprocket member 12 in the axial direction D3 toward the first sprocket body 16. In the illustrated embodiment, the third side surface 44a of the second recess 44 is defined on a surface of the first sprocket body 16.

Returning to FIG. 4, the bicycle sprocket 10 comprises a bump portion 46 provided in the shift-assisting part 32. The bump portion 46 is provided to the first sprocket member 12. In the illustrated embodiment, the bump portion 46 is integrally provided with the first main body 14 as a single unitary member. More specifically, the bump portion 46 is made of a non-metallic material and is provided to the base portion 28 of the first main body 14. The bump portion 46 can, however, be separately provided from the first sprocket member 12 as well as the projection 40. The bump portion 46 is provided between the projection 40 and the first recess 42. The bump portion 46 is at least partially provided between the first recess 42 and the second recess 44.

Figure 7:
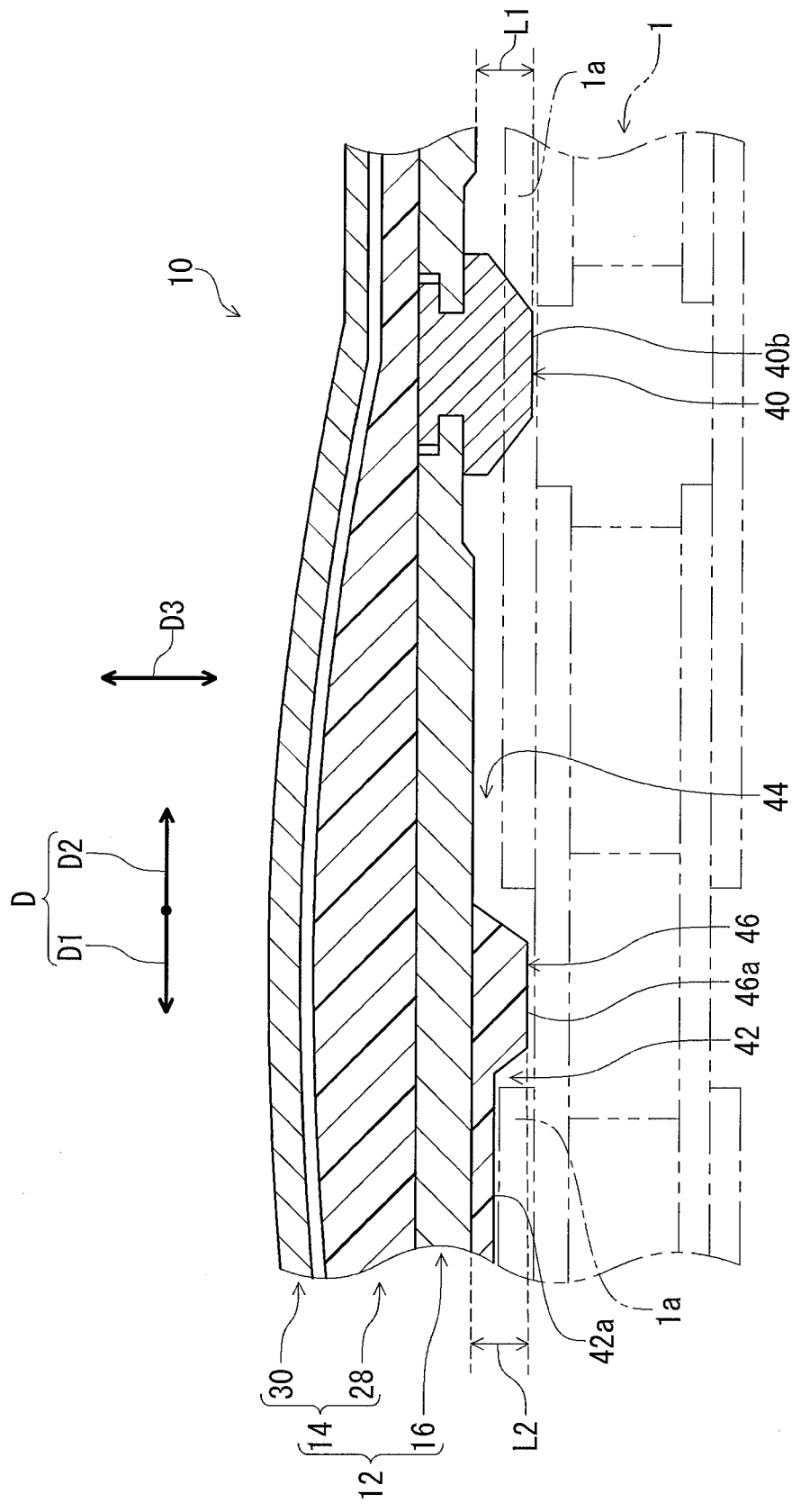
FIG. 7 is a cross-sectional view of a part of the bicycle sprocket taken along line VII-VII of FIG. 4.

As seen in FIGS. 4 and 7, the bump portion 46 is disposed between adjacent two outer link plates 1a of the bicycle chain 1 in the first chain-phase state. As seen in FIG. 4, the bump portion 46 does not overlap with the outer link plates 1a of the bicycle chain 1 in the first chain-phase state when viewed from the axial direction D3. Namely, the bump portion 46 does not interfere with the outer link plates 1a of the bicycle chain 1 in the first chain-phase state.

As seen in FIG. 4, the bump portion 46 is provided on a downstream side with respect to the projection 40 in the driving rotational direction D1 of the bicycle sprocket 10. A distance L21 between the projection 40 and the bump portion 46 is equal to or shorter than a maximum longitudinal length L22 of the outer link plate 1a of the bicycle chain 1. In the illustrated embodiment, the distance L21 between the projection 40 and the bump portion 46 is shorter than the maximum longitudinal length L22 of the outer link plate 1a of the bicycle chain 1. The first sprocket teeth 20 are arranged at a first pitch angle P1 in the circumferential direction D of the bicycle sprocket 10. A central angle P0 corresponding to a minimum circumferential distance between the projection 40 and the bump portion 46 is less than the first pitch angle P1. Similarly, the second sprocket teeth 26 are arranged at a second pitch angle P2 in the circumferential direction D. The central angle P0 corresponding to the minimum circumferential distance between the projection 40 and the bump portion 46 is less than the second pitch angle P2. The central angle P0, the first pitch angle P1, and the second pitch angle P2 are defined about the rotational center axis A (FIG. 1).

As seen in FIG. 4, each of the first sprocket teeth 20 has a tooth bottom 20a defining a root circle RC of the first sprocket teeth 20. The projection 40 is disposed adjacent to the root circle RC. In the illustrated embodiment, the projection 40 is closer to the root circle RC than to an inner periphery 12b of the first sprocket member 12 when viewed from the axial direction D3. The bump portion 46 is closer to the root circle RC than to the inner periphery 12b of the first sprocket member 12 in a radial direction of the bicycle sprocket 10 when viewed from the axial direction D3. The bump portion 46 is positioned radially inwardly from the projection 40. More specifically, a radially outermost end of the bump portion 46 is radially inwardly disposed with respect to a radially outermost end (i.e., the guiding part 40a) of the projection 40. The projection 40 is closer to the root circle RC than the bump portion 46 when viewed from the axial direction D3. A radial distance L31 between the projection 40 and the root circle RC is less than a radial distance L32 between the bump portion 46 and the root circle RC in a radial direction of the bicycle sprocket 10. The radial distance L31 can, however, be equal to or longer than the radial distance L32 in the radial direction of the bicycle sprocket 10.

The first sprocket member 12 may further include a closed tooth opening at least partially positioned radially outward from the root circle RC. In the illustrated embodiment, the first sprocket member 12 includes closed tooth openings 20b at least partially positioned radially outward from the root circle RC. The closed tooth openings 20b are respectively provided to the first sprocket teeth 20; however, at least one of the first sprocket teeth 20 can include the closed tooth opening 20b. Further, the closed openings 20b can be omitted from the first sprocket member 12 if needed and/or desired.

Figure 8:
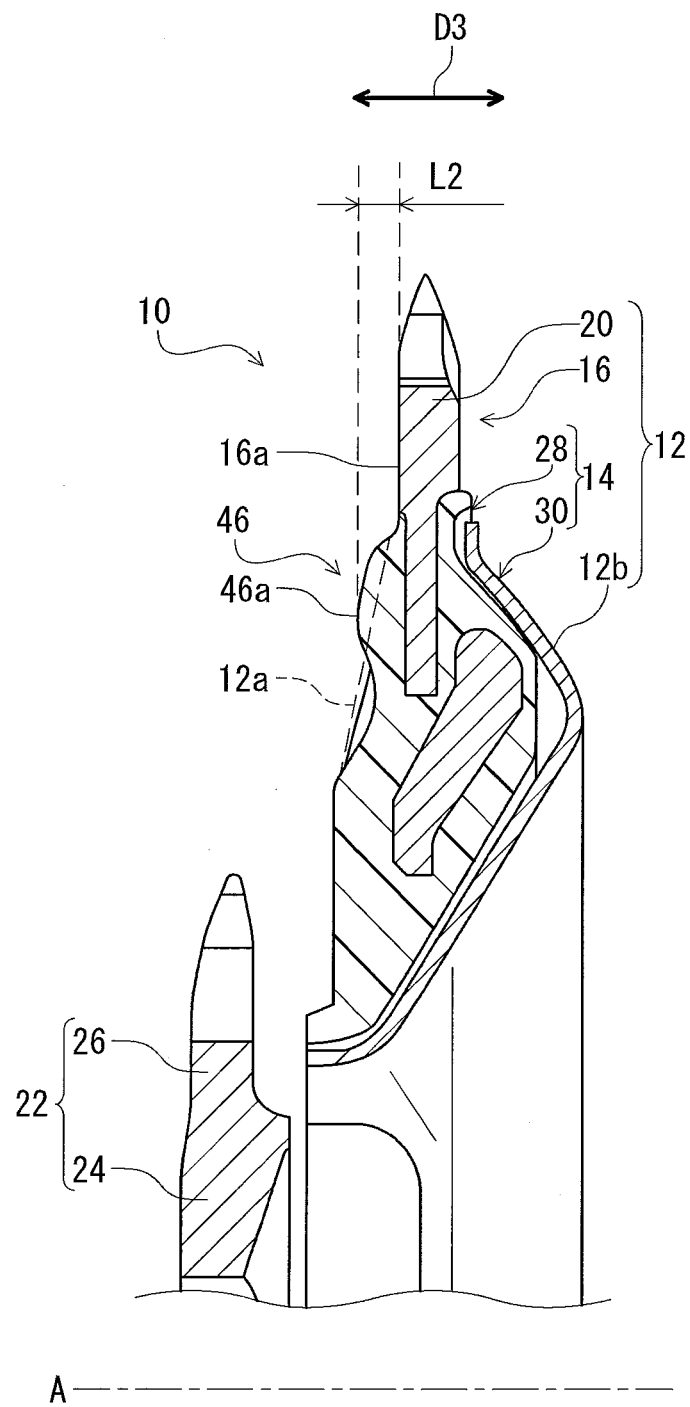
FIG. 8 is a cross-sectional view of a part of the bicycle sprocket taken along line VIII-VIII of FIG. 4.

As seen in FIG. 8, the bump portion 46 is provided on the axial surface 12a of the first sprocket member 12 to protrude from the axial surface 12a in the axial direction D3. The bump portion 46 includes a guiding surface 46a configured to guide the bicycle chain 1 away from the axial surface 12a of the first sprocket member 12 in the axial direction D3.

As seen in FIG. 5, the projection 40 protrudes from a tooth surface 16a of the first sprocket body 16 by a first maximum length L1 in the axial direction D3. The tooth surface 16a faces in the axial direction D3 and is contactable with the bicycle chain 1 in a state where the bicycle chain 1 engages with the first sprocket member 12. The first maximum length L1 is defined between the tooth surface 16a and the axial side surface 40b of the projection 40 in the axial direction D3. As seen in FIG. 8, the bump portion 46 protrudes from the tooth surface 16a of the first sprocket member 12 by a second maximum length L2 in the axial direction D3. The second maximum length L2 is defined between the tooth surface 16a and the guiding surface 46a of the bump portion 46 in the axial direction D3.

As seen in FIG. 7, the second maximum length L2 is substantially equal to the first maximum length L1. In the illustrated embodiment, the second maximum length L2 is shorter than the first maximum length L1; however, the second maximum length L2 can also be longer than the first maximum length L1.

Figure 9:
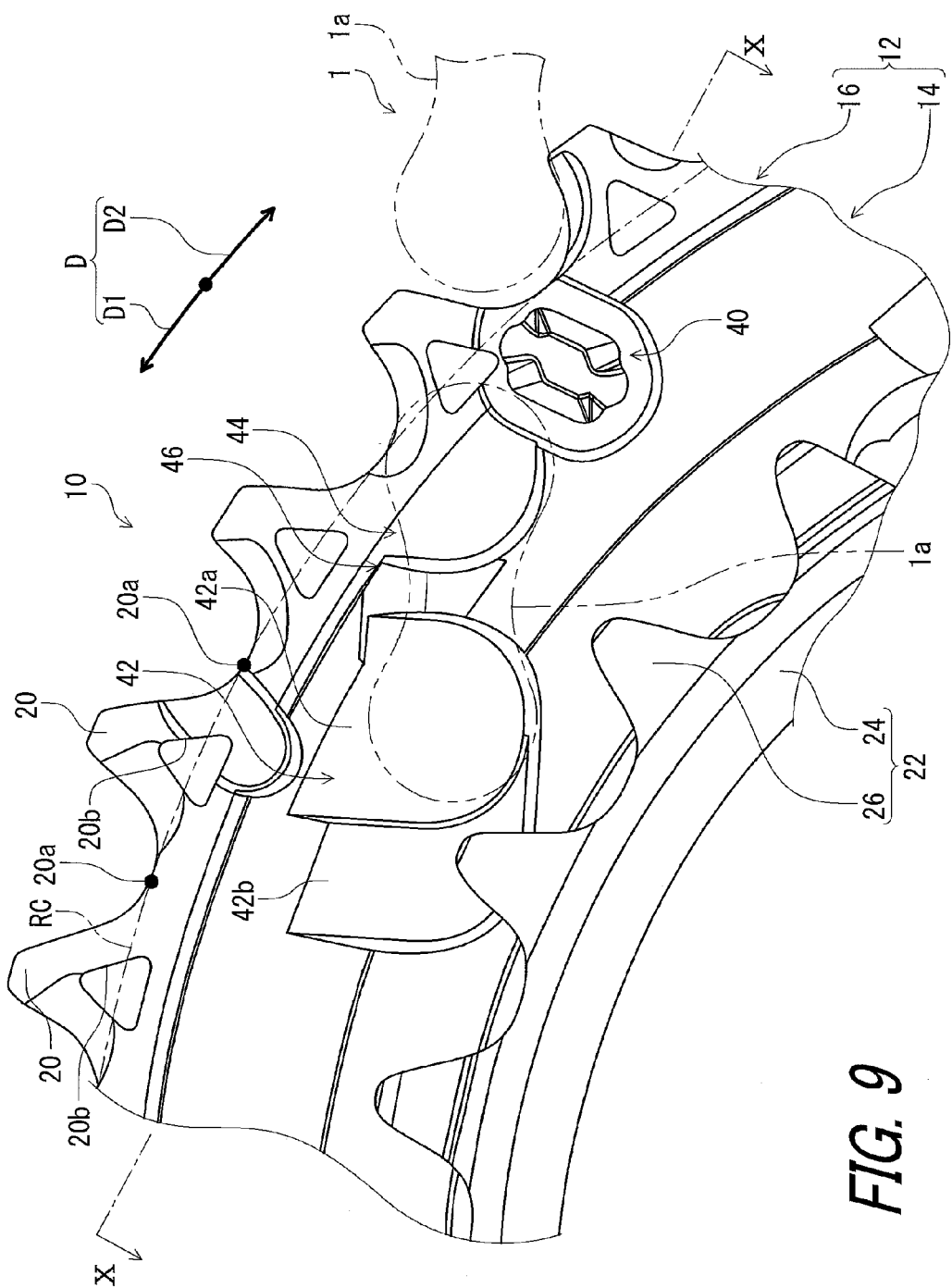
FIG. 9 is an enlarged inside elevational view of a part of the bicycle sprocket illustrated in FIG. 2 (a second chain-phase state)

As seen in FIG. 9, the bicycle chain 1 can be offset, with respect to the first chain-phase state of the bicycle chain 1 illustrated in FIG. 4, by a chain pitch of the bicycle chain 1 in a second chain-phase state that is different from the first chain-phase state. The bump portion 46 at least partially overlaps with the outer link plate 1a of the bicycle chain 1 in the second chain-phase state whereas the bump portion 46 does not overlap with the outer link plate 1a in the first chain-phase state when viewed from the axial direction D3. For example, the bump portion 46 at least partially overlaps with a longitudinal middle portion of the outer link plate 1a of the bicycle chain 1 in the second chain-phase state when viewed from the axial direction D3.

Figure 10:
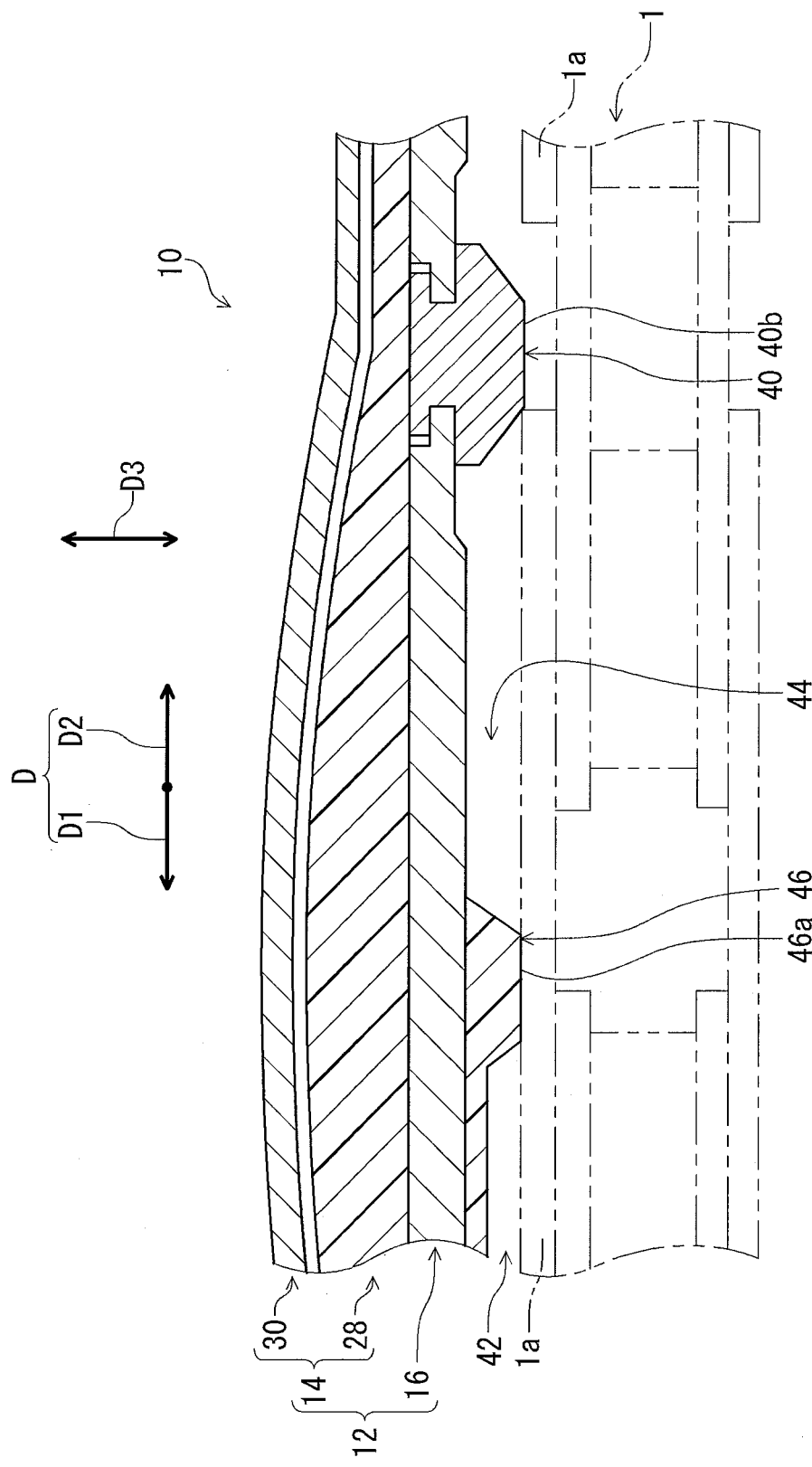
FIG. 10 is a cross-sectional view of a part of the bicycle sprocket taken along line X-X of FIG. 9.

As seen in FIG. 10, the bump portion 46 is configured to guide the bicycle chain 1 away from the first sprocket member 12 in the axial direction D3 parallel to the rotational center axis A (FIG. 1) in the second chain-phase state that is different from the first chain phase state. The bump portion 46 is configured to guide the bicycle chain 1 away from the axial surface 12a of the first sprocket member 12 in the axial direction D3 when in the second chain-phase state. When the bicycle chain 1 is axially guided away from the first sprocket member 12 using the front derailleur (not shown) during the gear-shifting operation, the bicycle chain 1 is moved away from the first sprocket member 12 in the axial direction D3 by the bump portion 46 in the second chain-phase state. This reduces interference between the projection 40 and the bicycle chain 1 in the second chain-phase state during the gear-shifting operation. Accordingly, with the bicycle sprocket 10, it is possible to reduce undesired impact during the gear-shifting operation.

Second Embodiment

Figure 11:
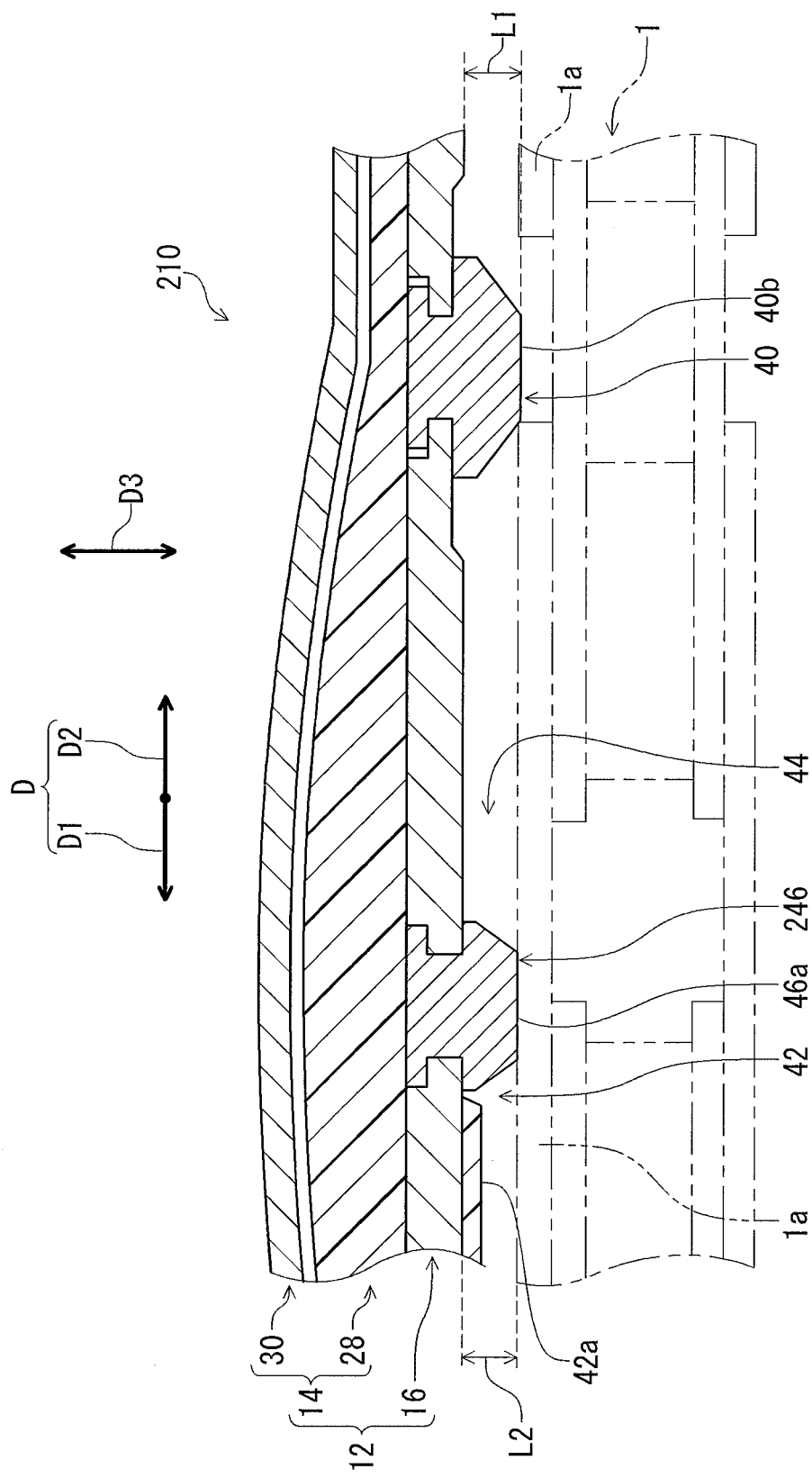
FIG. 11 is a cross-sectional view of a part of a bicycle sprocket in accordance with a second embodiment.

A bicycle sprocket 210 in accordance with a second embodiment will be described below referring to FIG. 11. The bicycle sprocket 210 has the same configuration as the bicycle sprocket 10 except for the structure of the bump portion. Thus, elements having substantially the same function as those in the first embodiment will be numbered the same here, and will not be described again in detail here for the sake of brevity.

The bicycle sprocket 210 comprises a bump portion 246 provided to the first sprocket member 12. Unlike the bump portion 46 of the first embodiment, the bump portion 246 is attached to the first sprocket member 12 as a separate member from the first main body 14. In the illustrated embodiment, the bump portion 246 is attached to the first sprocket body 16 as a separate member from the first main body 14. The bump portion 246 can be made of material different from materials of the first sprocket member 12.

With the bicycle sprocket 210, the bump portion 246 is configured to guide the bicycle chain 1 away from the first sprocket member 12 in the axial direction D3 parallel to the rotational center axis in the second chain-phase state. This reduces interference between the projection 40 and the bicycle chain 1 in the second chain-phase state during the gear shifting. Accordingly, with the bicycle sprocket 210, it is possible to reduce undesired impact during the gear-shifting operation.

Third Embodiment

A bicycle sprocket 310 in accordance with a third embodiment will be described below referring to FIG. 12. The bicycle sprocket 310 has the same configuration as the bicycle sprocket 10 except for the structure of the first sprocket member. Thus, elements having substantially the same function as those in the above embodiments will be numbered the same here, and will not be described again in detail here for the sake of brevity.

Figure 12:
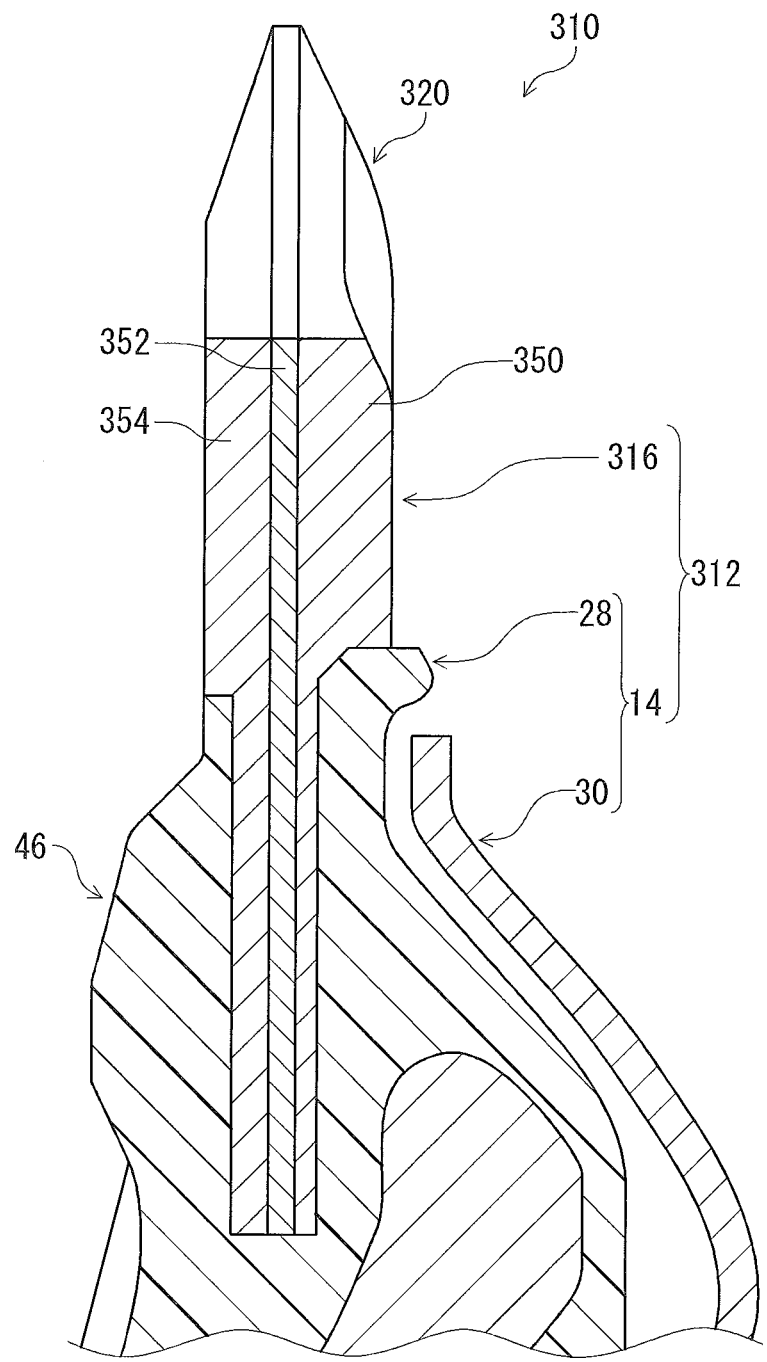
FIG. 12 is a cross-sectional view of a part of a bicycle sprocket in accordance with a third embodiment.

As seen in FIG. 12, the bicycle sprocket 310 comprises a first sprocket member 312. The first sprocket member 312 includes the first main body 14 and a first sprocket body 316. The first sprocket body 316 is attached to the first main body 14 and includes first sprocket teeth 320 arranged in the circumferential direction D of the bicycle sprocket 310. The first sprocket body 316 has a multi-layered structure with different materials.

The first sprocket body 316 includes a first sprocket layer 350, a second sprocket layer 352, and a third sprocket layer 354. The first sprocket layer 350 is made of a first-layer material comprising iron. The second sprocket layer 352 is made of a second-layer material comprising aluminum. The third sprocket layer 354 is made of a third-layer material comprising iron. The second sprocket layer 352 is provided between the first sprocket layer 350 and the third sprocket layer 354 in the axial direction D3. Possible examples of materials of the first and third sprocket layers 350 and 354 include iron and stainless steel. Possible examples of materials of the second sprocket layer 352 include aluminum, titanium, magnesium and beryllium.

In the illustrated embodiment, the first sprocket layer 350 and the third sprocket layer 354 are bonded to the second sprocket layer 352 by diffusion bonding, for example. At least one of the first sprocket layer 350 and the third sprocket layer 354 can be bonded to the second sprocket layer 352 with adhesive. The second sprocket layer 352 is made of a metallic material; however, the second sprocket layer 352 can be made of a second-layer material comprising a non-metallic material. For example, the second-layer material can comprise fiber reinforced plastic. In a case where the second-layer material is fiber reinforced plastic, the first and third sprocket layers 350 and 354 are bonded to the second sprocket layer 352 by an integral molding process.

With the bicycle sprocket 310, it is possible to save weight of the bicycle sprocket 310 in addition to the reduction of undesired impact during the gear-shifting operation.

Fourth Embodiment

A bicycle sprocket 410 in accordance with a fourth embodiment will be described below referring to FIG. 13. The bicycle sprocket 410 has the same configuration as the bicycle sprocket 10 except for the first sprocket member. Thus, elements having substantially the same function as those in the above embodiments will be numbered the same here, and will not be described again in detail here for the sake of brevity.

Figure 13:
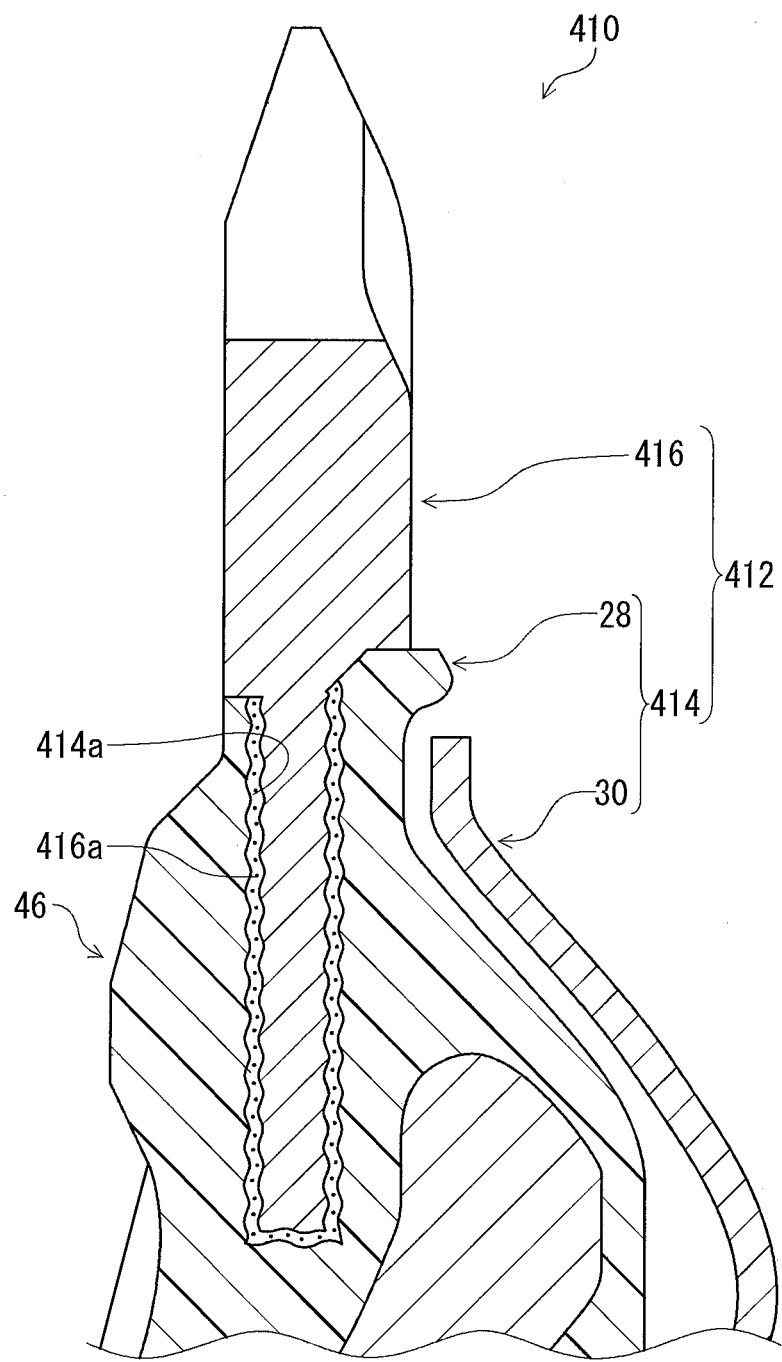
FIG. 13 is a cross-sectional view of a part of a bicycle sprocket in accordance with a fourth embodiment.

As seen in FIG. 13, the bicycle sprocket 410 comprises a first sprocket member 412. The first sprocket member 412 includes a first main body 414 and a first sprocket body 416. The first sprocket body 416 is attached to the first main body 414. Unlike the first sprocket member 12 of the first embodiment, roughening process is applied to an attachment surface of at least one of the first main body 414 and the first sprocket body 416. Possible examples of the roughening process include machine processes such as shot blasting, chemical processes such as etching, and other processes such as laser machining.

More specifically, the first sprocket body 416 includes a first-sprocket attachment surface 416a. The first main body 414 includes a first main-body attachment surface 414a configured to be attached to the first sprocket attachment surface 416a of the first sprocket body 416. At least one of the first sprocket attachment surface 416a and the first main-body attachment surface 414a is at least partially rougher than a surface of the first sprocket member 412 other than the first sprocket attachment surface 416a and the first main-body attachment surface 414a. In the illustrated embodiment, the roughening process is applied to each of the first sprocket attachment surface 416a and the first main-body attachment surface 414a. Areas of the first sprocket attachment surface 416a and the first main-body attachment surface 414a are not limited to the illustrated embodiment in FIG. 13.

With the bicycle sprocket 410, it is possible to increase the strength of attachment between the first main body 414 and the first sprocket body 416 in addition to the reduction of undesired impact during the gear-shifting operation.

In the above embodiments, the term "attached" or "attaching", as used herein, encompasses configurations in which an element is directly attached to another element by affixing the element directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "fixed" and their derivatives except for the terms "bonded" and "bonding."

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers such as the terms "first" or "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a first sprocket member rotatable about a rotational center axis and configured to engage with a bicycle chain;
   a projection provided to the first sprocket member and configured to guide the bicycle chain to engage with the first sprocket member in a first chain-phase state where the bicycle chain is shifted from a second sprocket member to the first sprocket member; and
   a bump portion provided to the first sprocket member and configured to guide the bicycle chain away from the first sprocket member in an axial direction parallel to the rotational center axis in a second chain-phase state that is different from the first chain phase state, a distance between the projection and the bump portion being equal to or shorter than a maximum longitudinal length of an outer link plate of the bicycle chain.

2. The bicycle sprocket according to claim 1, wherein the bump portion is provided on a downstream side with respect to the projection in a driving rotational direction of the bicycle sprocket.

3. The bicycle sprocket according to claim 1, wherein the first sprocket member includes first sprocket teeth arranged in a circumferential direction of the bicycle sprocket,
   each of the first sprocket teeth has a tooth bottom defining a root circle of the first sprocket teeth, and
   the projection is disposed adjacent to the root circle.

4. The bicycle sprocket according to claim 1, wherein the bump portion is positioned radially inwardly from the projection.

5. The bicycle sprocket according to claim 1, wherein the first sprocket member includes
   a first main body having an annular shape, and
   a first sprocket body attached to the first main body and including first sprocket teeth arranged in a circumferential direction of the bicycle sprocket.

6. The bicycle sprocket according to claim 5, wherein the bump portion is integrally provided with the first main body as a single unitary member.

7. The bicycle sprocket according to claim 5, wherein the bump portion is attached to the first sprocket member as a separate member from the first main body.

8. The bicycle sprocket according to claim 5, wherein the first main body is made of a metallic material comprising aluminum.

9. The bicycle sprocket according to claim 5, wherein the first main body comprises a non-metallic material.

10. The bicycle sprocket according to claim 9, wherein the non-metallic material comprises fiber reinforced plastic.

11. The bicycle sprocket according to claim 10, wherein the first sprocket body and the first main body are attached to each other by an integral molding process.

12. The bicycle sprocket according to claim 5, wherein the first sprocket body includes a first-sprocket attachment surface,
    the first main body includes a first main-body attachment surface configured to be attached to the first sprocket attachment surface of the first sprocket body, and
    at least one of the first sprocket attachment surface and the first main-body attachment surface is at least partially rougher than a surface of the first sprocket member other than the first sprocket attachment surface and the first main-body attachment surface.

13. The bicycle sprocket according to claim 5, wherein the first main body includes a crank attachment portion to which a crank arm is to be attached.

14. The bicycle sprocket according to claim 5, wherein the first sprocket body is made of a first material comprising one of iron and titanium.

15. The bicycle sprocket according to claim 5, wherein the first sprocket body has a multi-layered structure with different materials.

16. The bicycle sprocket according to claim 15, wherein the first sprocket body includes
    a first sprocket layer made of a first-layer material comprising iron,
    a second sprocket layer made of a second-layer material comprising aluminum, and
    a third sprocket layer made of a third-layer material comprising iron, the second sprocket layer being provided between the first sprocket layer and the third sprocket layer in the axial direction.

17. The bicycle sprocket according to claim 15, wherein the first sprocket body includes
    a first sprocket layer made of a first-layer material comprising iron,
    a second sprocket layer made of a second-layer material comprising a non-metallic material, and
    a third sprocket layer made of a third-layer material comprising iron, the second sprocket layer being provided between the first sprocket layer and the third sprocket layer in the axial direction.

18. The bicycle sprocket according to claim 17, wherein the second-layer material comprises fiber reinforced plastic.

19. The bicycle sprocket according to claim 1, wherein the first sprocket member includes an axial surface facing in the axial direction of the bicycle sprocket,
    the bump portion is provided on the axial surface of the first sprocket member to protrude from the axial surface in the axial direction, and the bump portion is configured to guide the bicycle chain away from the axial surface of the first sprocket member in the axial direction in the second chain-phase state.

20. The bicycle sprocket according to claim 1, wherein the first sprocket member includes first sprocket teeth arranged in a circumferential direction of the bicycle sprocket,
each of the first sprocket teeth has a tooth bottom defining a root circle of the first sprocket teeth, and
the first sprocket member further includes a closed tooth opening at least partially positioned radially outward from the root circle.

21. The bicycle sprocket according to claim 1, wherein the first sprocket member includes first sprocket teeth arranged at a first pitch angle in a circumferential direction of the bicycle sprocket, and
a central angle corresponding to a minimum circumferential distance between the projection and the bump portion is less than the first pitch angle.

22. The bicycle sprocket according to claim 1, wherein the distance between the projection and the bump portion is equal to or shorter than a chain pitch of the bicycle chain.

23. A bicycle sprocket comprising:
a first sprocket member rotatable about a rotational center axis and configured to engage with a bicycle chain;
a projection provided to the first sprocket member and configured to guide the bicycle chain to engage with the first sprocket member in a first chain-phase state where the bicycle chain is shifted from a second sprocket member to the first sprocket member; and
a bump portion provided to the first sprocket member and configured to guide the bicycle chain away from the first sprocket member in an axial direction parallel to the rotational center axis in a second chain-phase state that is different from the first chain phase state,
the first sprocket member including
a first main body having an annular shape, and
a first sprocket body attached to the first main body and including first sprocket teeth arranged in a circumferential direction of the bicycle sprocket, and
the first main body including
a base portion to which the first sprocket body is attached, and
a cover portion attached to the base portion to at least partially cover the base portion.

24. A bicycle sprocket comprising:
a first sprocket member rotatable about a rotational center axis and configured to engage with a bicycle chain;
a projection provided to the first sprocket member and configured to guide the bicycle chain to engage with the first sprocket member in a first chain-phase state where the bicycle chain is shifted from a second sprocket member to the first sprocket member; and
a bump portion provided to the first sprocket member and configured to guide the bicycle chain away from the first sprocket member in an axial direction parallel to the rotational center axis in a second chain-phase state that is different from the first chain phase state,
the first sprocket member including a first recess configured to reduce interference between the first sprocket member and the bicycle chain when the projection guides the bicycle chain to engage with the first sprocket member, and
the bump portion being provided between the projection and the first recess.

25. The bicycle sprocket according to claim 24, wherein the first sprocket member includes a second recess to reduce interference between the first sprocket member and the bicycle chain when the projection guides the bicycle chain to engage with the first sprocket member,
the second recess is at least partially provided between the projection and the first recess, and
the bump portion is at least partially provided between the first recess and the second recess.

* * * * *